United States Patent [19]

Fasching

[11] 3,988,669
[45] Oct. 26, 1976

[54] AUTOMATIC CONTROL AND DETECTOR FOR THREE-TERMINAL RESISTANCE MEASUREMENT

[75] Inventor: George E. Fasching, Morgantown, W. Va.

[73] Assignee: The United States of America as represented by the United States Energy Research and Development Administration, Washington, D.C.

[22] Filed: Aug. 15, 1975

[21] Appl. No.: 605,370

[52] U.S. Cl. ................................ 324/65 R; 324/64
[51] Int. Cl.² ..................................... G01R 27/14
[58] Field of Search ................. 324/65 R, 65 P, 64

[56] References Cited
UNITED STATES PATENTS 3,754,186   8/1973   Sambhu ............................ 324/65 R Primary Examiner—Stanley T. Krawczewicz
Attorney, Agent, or Firm—Dean E. Carlson; David S. Zachry; David E. Breeden

[57] ABSTRACT

A device is provided for automatic control and detection in a three-terminal resistance measuring instrument. The invention is useful for the rapid measurement of the resistivity of various bulk material with a three-terminal electrode system. The device maintains the current through the sample at a fixed level while measuring the voltage across the sample to detect the sample resistance. The three-electrode system contacts the bulk material and the current through the sample is held constant by means of a control circuit connected to a first of the three electrodes and works in conjunction with a feedback controlled amplifier to null the voltage between the first electrode and a second electrode connected to the controlled amplifier output. An A.C. oscillator provides a source of sinusoidal reference voltage of the frequency at which the measurement is to be executed. Synchronous reference pulses for synchronous detectors in the control circuit and an output detector circuit are provided by a synchronous pulse generator. The output of the controlled amplifier circuit is sampled by an output detector circuit to develop at an output terminal thereof a D.C. voltage which is proportional to the sample resistance R. The sample resistance is that segment of the sample between the area of the first electrode and the third electrode, which is connected to ground potential.

6 Claims, 10 Drawing Figures 3,988,669

AUTOMATIC CONTROL AND DETECTOR FOR THREE-TERMINAL RESISTANCE MEASUREMENT

BACKGROUND OF THE INVENTION

This invention relates generally to resistance measuring devices and more specifically to a three-terminal resistance measuring device for determining the resistance of sample bulk material. In the art of well logging, for example, it is often necessary to obtain measurements of the resistivity of the wall material and to detect and characterize fractures existing along the wall of the well by resistivity measurements with a three-terminal resistance measuring technique. The change in resistance as sensed by a three-terminal electrode system may be correlated with the size and direction of well wall fractures. It has been a practice in the art to utilize a bulky motor servo system that is extremely slow and too large to lower into a small diameter well. Thus, there is a need for a compact instrument which will rapidly respond to resistance changes in a three-terminal electrode arrangement and which may be remotely operated so that it may be readily employed in well logging for accurate measurements.

SUMMARY OF THE INVENTION

In view of the above need, it is a primary object of this invention to provide a three-terminal resistance measuring instrument which may be used for rapid measurement of resistivity of various bulk material.

It is a further object of this invention to provide a three-terminal bulk material resistance measuring instrument which may be readily used in well logging for quick and accurate well wall resistance measurements.

Yet another object of this invention is to provide a three-terminal bulk material resistance measuring instrument as in the above objects which provides automatic resistance measurements over a wide range of bulk material resistance values.

Other objects and many of the attendant advantages of the present invention will be obvious from the following detailed description taken in conjunction with the drawings.

BRIEF DESCRIPTION OF THE DRAWINGS

In FIG. 2A, for measuring bulk sample material, the probe face contacts the material. In FIG. 2B, for measuring bulk material such as a well wall, the probe is electrically coupled to the wall through water.

DETAILED DESCRIPTION

Figure 1:
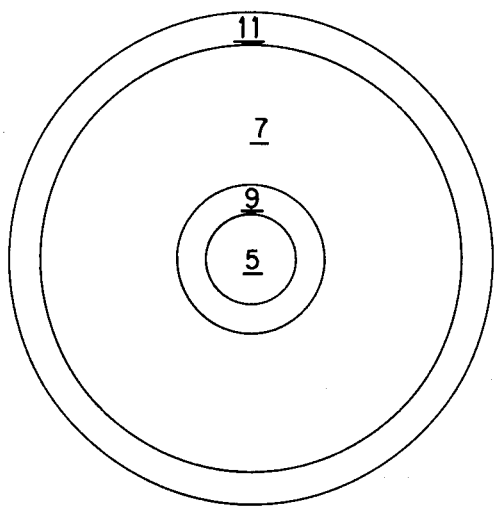
FIG. 1 is a pictorial view of the face of a probe arrangement for use in the subject invention.
Figure 2A:
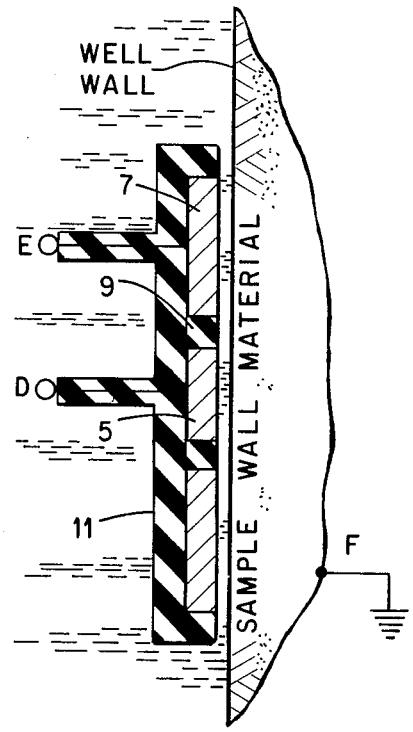
FIGS. 2A and 2B are sectional views of the probe of FIG. 1 for alternate applications of bulk material resistance measurements.
Figure 2B:
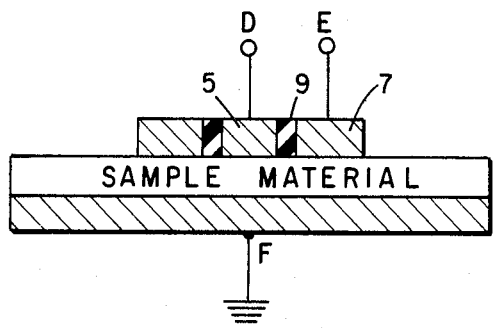

Referring now to FIGS. 1 and 2A and 2B wherein there is shown a probe arrangement for use in bulk material resistance measurements, the three terminals consist of an inner guarded electrode 5 connected to terminal D, a guard electrode 7 connected to terminal E, and an earth ground F. The guard electrode 7 is in the form of an annular ring spaced from center electrode 5 by means of an insulating ring 9. The remainder of the probe consists of insulation 11 disposed about electrodes 5 and 7 and their leads whose purpose is to prevent current flow to other than the face of the electrodes. For well measurements the well contains water, as shown in FIG. 2A, either occurring naturally or added intentionally for the measurement. There is a thin film of water electrically coupling the electrodes 5 and 7 to the well wall which may have a minor effect on the resistance measurements if the water is not sufficiently conductive. Its conductivity may be enhanced, if necessary, by adding salt to the water.

The face of the probe is that shown in FIG. 1, which may be designed to be moved along a well wall, as shown in FIG. 2A, such that the wall material beneath the guarded electrode 5 may be sampled for its resistivity by the circuit in the following disclosure. The third terminal F of the three-terminal arrangement for resistivity measurement is the earth ground represented as terminal F in FIG. 2A.

As shown in FIG. 2B, sample bulk material resistance may be measured by placing the probe face directly on the sample material which is disposed on an underlying conductive surface 12 connected to ground. In either case the probe is electrically coupled directly to the sample material.

Figure 3:
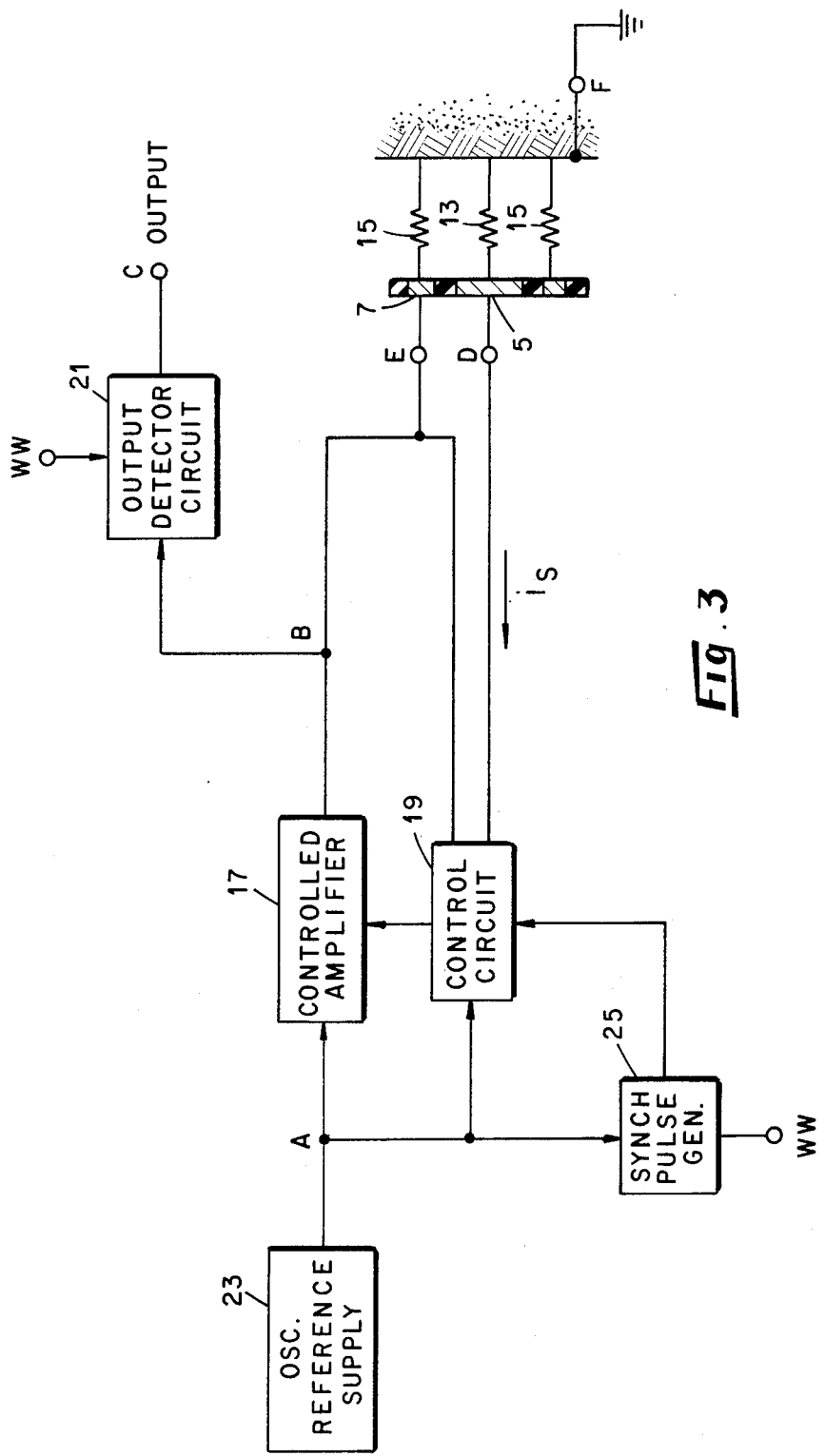
FIG. 3 is a simplified block diagram of the detector and control circuit for three-terminal resistance measuring according to the present invention.
Figure 4:
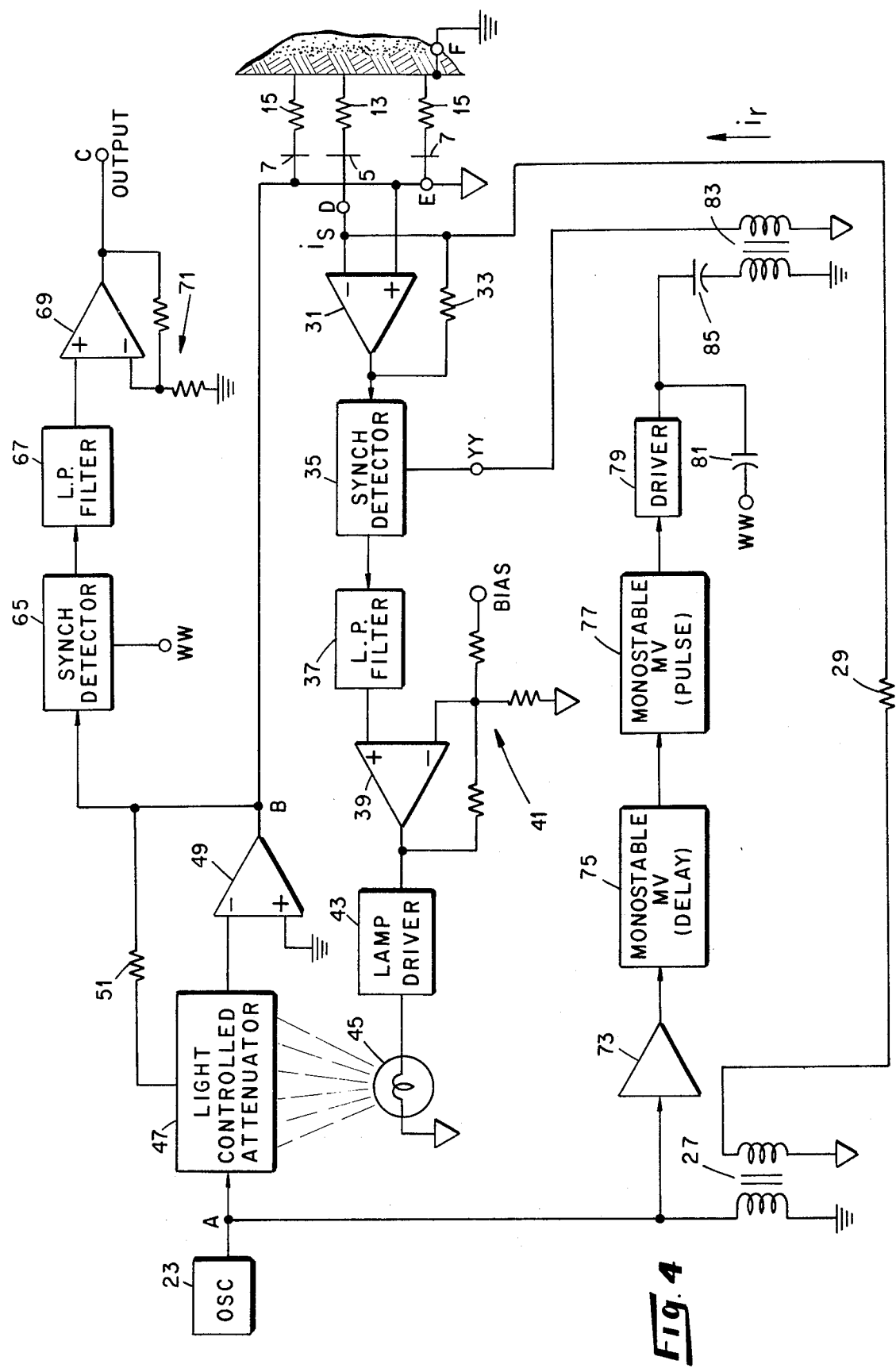
FIG. 4 is a detailed block diagram of the circuit shown in FIG. 3.
Figure 7:
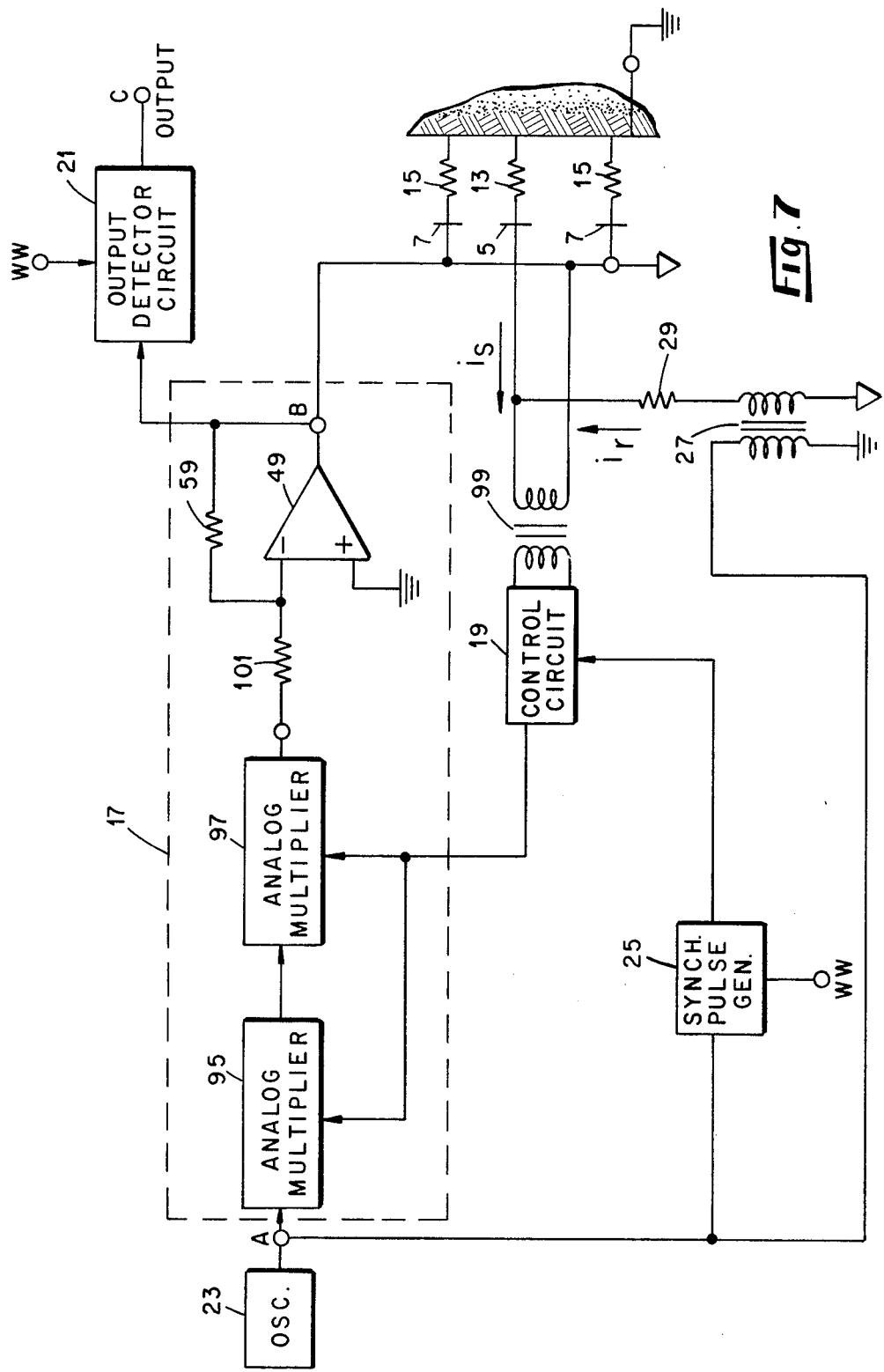
FIG. 7 is a simplified block diagram of an alternate embodiment of the detector and control circuit as shown in FIG. 4.

Referring now to FIG. 3, there is shown in simplified block form the circuit for making the wall material resistance measurement by using the probe arrangement shown in FIGS. 1 and 2A. The probe, including the central guarded electrode 5, the annular ring guard electrode 7, and the ground electrode terminal F, are represented schematically wherein the sample resistance beneath the electrode 5 is represented by a resistor 13. The distributed sample resistance viewed by the annular ring guard electrode 7 is represented by resistors 15. The guard electrode 7 is connected to the output of a voltage controlled amplifier 17 which maintains an A.C. voltage drop across the sample, represented by resistors 15, such that the current through the sample is maintained equal to a reference current generated within the control circuit 19. The A.C. voltage at node B is automatically adjusted to control the voltage across the sample at a value to maintain the current $i_s$ almost equal to the reference current. This A.C. voltage is sampled by an output detector circuit 21 to provide a D.C. output voltage at output terminal C which is proportional to the sample resistance represented by resistor 13. The A.C. voltage for the circuit is supplied from an oscillator reference supply source 23. The oscillator 23 provides a source of sinusoidal reference voltage of the frequency at which the resistance measurement is to be executed. The reference voltage from node A is supplied to the controlled amplifier 17 as its input voltage and to the control circuit 19 to provide the reference current source $i_r$, as will be described with reference to FIG. 4. Synchronous reference pulses for synchronous detectors in the control circuit 19 and the output detector 21 are generated from the time base supplied by oscillator 23 in a sync pulse generator 25. The sync pulses generated by generator 25 are used in the control circuit 19 to provide a D.C. error signal representative of the difference between the sample current $i_s$ and the reference current $i_r$ so that a feedback arrangement may be used, either of the type including a light control feedback as shown in FIG. 4, or a completely electric analog feedback control as shown in FIG. 7. In either case, the D.C. error voltage adjusts the output of the control amplifier 17 so that the voltage at node B is maintained at a value which forces the sample current $i_s$ to be substantially equal to the reference current $i_r$. Thus, the voltage output at terminal C of the output detector circuit, which again is a D.C. voltage, is proportional to the sample resistance 13.

Referring now to FIG. 4, wherein there is shown a detailed block diagram of one embodiment of the automatic control and detector circuit of FIG. 3, it will be seen that the reference supply voltage from oscillator 23 is connected to the primary winding of an isolation transformer 27 of the control circuit 19 whose secondary winding supplies the reference current $i_r$ through a resistor 29 connected between the secondary winding of transformer 27 and the inverting input of an operational amplifier 31. Amplifier 31 is connected as a summing amplifier with negative feedback for gain control by means of a resistor 33 connected between the output of amplifier 31 and the inverting input thereof. The non-inverting input of amplifier 31 is connected to the guard electrode terminal E of the probe arrangement. The output of amplifier 31 is connected to the input of a synchronous detector 35. The detector 35 receives sync pulses at the input terminal YY from the sync pulse generator which will be described in detail hereinbelow. The output of detector 35 is a D.C. signal proprotional to the difference between the sample current $i_s$ and the reference current $i_r$.

The output of detector 35 is connected to the input of a low pass filter 37 whose output is connected to the non-inverting input of an operational amplifier 39. Amplifier 39 is connected as a conventional fixed gain amplifier by means of a negative feedback and biasing circuit generally indicated at 41. The output of amplifier 39 is connected to the input of a lamp driver 43 whose output is connected to the circuit floating common, as indicated by the triangular common connection throughout portions of the circuit, through a lamp system 45.

In this embodiment, the light level from lamp system 45 is the analog signal feedback coupling to the controlled amplifier 17 shown in FIG. 3, which here consists of light controlled attenuator 47 and operational amplifier 49. The light path feedback is employed to isolate the floating circuit portion from the remainder of the circuit. The light controlled attenuator senses the lamp system 45 intensity and adjusts the signal applied to the input thereof from oscillator 23 to the inverting input of the operational amplifier 49. The non-inverting input of amplifier 49 is connected to ground. The output of amplifier 49 is connected in a negative feedback circuit which includes a resistor 51 connected between the output of amplifier 49 and the light controlled attenuator 47.

Figure 5:
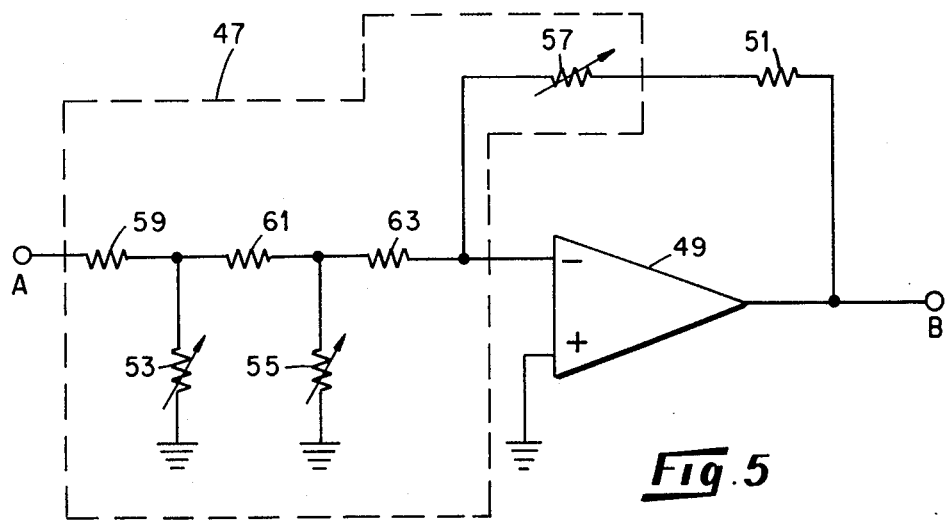
FIG. 5 is a schematic diagram of the light control LED attenuator shown in block form in FIG. 4.

Referring now to FIG. 5, there is shown a detailed schematic diagram of the light controlled attenuator 47 including its connection to amplifier 49 and the feedback resistor 51. The lamp system 45 includes three individual lamps, not shown, each coupled to separate photoconductive cells 53, 55, and 57. The three lamps in lamp system 45 are connected in parallel between driver 43 output and floating common. The A.C. signal input at terminal A is connected to a resistive shunt attenuation circuit which consists of resistors 59, 61, and 63 connected in series between terminal A and the inverting input of amplifier 49. The photocell 53 is connected between the common terminal between resistors 59 and 61, and ground. The second photocell 55 is connected between the common junction of resistors 61 and 63 and ground. The third photocell 57 is connected in series with resistor 51 in the feedback loop of amplifier 49, which is connected to the inverting input. By incorporating three stages of attenuation, wide range control may be achieved with this attenuating network in which the amplifier 49 gain is adjusted according to the lamp system 45 light intensity. As the light intensity increases, the resistance of the photocell 53, 55, and 57 decreases proportionally so that the gain of amplifier 49 decreases. The attenuator in this configuration permits up to four decades of voltage level change at the output of amplifier 49. As a result, a four-decade range of sample resistance can be measured without a range change.

Referring again to FIG. 4, the output terminal B of amplifier 49 is connected to the input of a second synchronous detector 65. The detector 65 receives sync pulses at terminal WW and converts the A.C. voltage at node B into a D.C. signal at the output thereof which is connected to the input of a low pass filter 67. The output of filter 67 is connected to the non-inverting input of an operational amplifier 69. Amplifier 69 is connected as a fixed gain amplifier in accordance with the conventional negative feedback circuit generally indicated at 71. The output of amplifier 69 appears at terminal C of the circuit which is the D.C. signal proportional to the sample resistance 13.

To provide the sync pulses for the synchronous detectors 35 and 65, the A.C. signal from oscillator 23 at node A is connected to the input of amplifier 73. The output of amplifier 73 is connected to the input of a first of two series-connected monostable multivibrators 75 and 77. Monostable multivibrator 75 provides a fixed delay of approximately one quarter period at reference frequency and is triggered at zero crossing of positive going slope of A.C. signal at A. Following the delay, monostable multivibrator 77 produces a fixed duration pulse to the input of a driver circuit 79 connected to the output of multivibrator 77. The circuit produces pulses of approximately 10 microsecond duration of 10 volts peak height to drive the synchronous detectors 35 and 65. Detector 65 is driven directly through a capacitor 81 connected between the output of driver 79 and the sync input WW of detector 65. To provide proper circuit isolation, detector 35 is connected to the output of driver 79 through an isolating transformer 83. Thus, the output of driver 79 is connected through a capacitor 85 to the primary winding of isolatinng transformer 83. The detector sync input YY is connected in series with the secondary winding of transformer 83 which has its opposite terminal connected to the floating common connection of the circuit.

In operation, the A.C. oscillator 23 provides a reference sinusoidal voltage at node A that is amplified by amplifier 49 after attenuation by the light control attenuator 47. The measuring voltage source at the frequency of oscillator 23 is provided by the amplifier 49 output at node B. The output of amplifier 49 supplies a low impedance wide-range, high-current output to drive the three terminal resistance probe arrangement to determine the sample resistance 13 and also drive synchronous detector 65. It is this voltage, manipulated by the controller 19 (FIG. 3) consisting of components 27, 29, 31, 33, 35, 37, 39, 43, and 45 via the light controlled attenuator 47, that is automatically adjusted to maintain the sample current $i_s$ from the guarded electrode 5 very nearly equal to the reference current $i_r$. Current $i_r$ is set by resistor 29 to the level at which the sample measurement is desired. Any small change in the sample current $i_s$ is amplified by amplifier 31. The synchronous detector 35 converts the A.C. voltage error signal to a D.C. error voltage.

Figure 6:
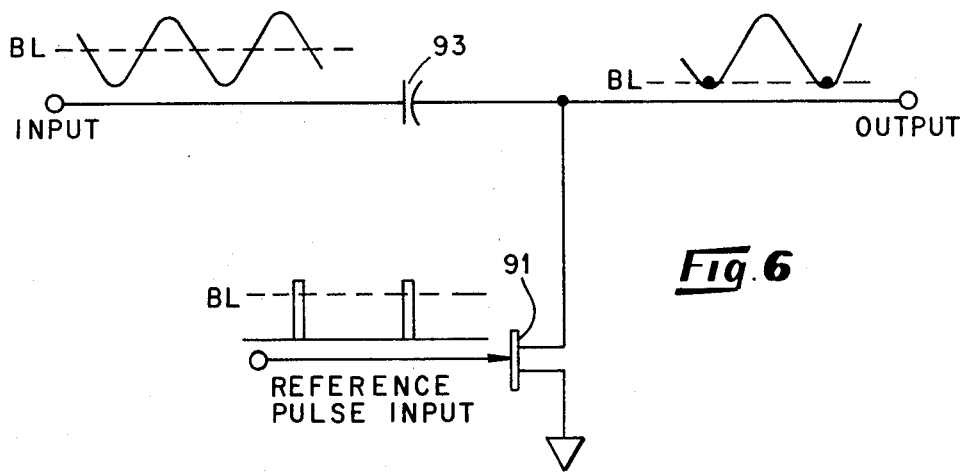
FIG. 6 is a schematic diagram of the synchronous detectors shown in block form in FIG. 4.

One embodiment of the synchronous detector is shown in detail in FIG. 6. This type of detector requires a reference pulse input to clamp the output voltage to common at the proper instance, normally at the time the input alternating sinusoid passes through a minimum, as shown, or it can be timed for a maximum. Pulses from the sync pulse generator are applied to the gate electrode of a field effect transistor 91. Transistor 91 has its source electrode connected to the floating system common and the drain electrode is connected directly to the output of the detector while the input of the detector is connected to the transistor 91 drain through a capacitor 93. The monostable multivibrator 75 delay (FIG. 4) is set so that the reference pulses to the gate of FET 91 are timed to coincide with the minimum portion of the input A.C. error signal to the detector 35, as shown in FIG. 6. This timing provides a positive D.C. output voltage of an amplitude equal to the peak height of the input sinusoid. The voltages indicated are measured from the base line (BL) which is the floating common reference. As shown, the output contains a large carrier component that can be partially removed with a low pass filter.

Returning now to FIG. 4, it will be seen that the output of the synchronous detector 35 is filtered by a low pass filter 37 and further amplified by means of amplifier 39. The biasing circuit 41 for amplifier 39 is set to yield a lamp system 45 light output at some optimum level for the light control attenuator 47. As pointed out above, the light intensity from the lamp system 45 is indicative of the D.C. error signal and accordingly adjusts the gain of amplifier 49 to maintain the voltage across the sample beneath the guard electrode 7 so that the sample current $i_s$ is maintained substantially equal to the reference current $i_r$.

With a three-terminal electrode system, valid measurement of resistance is possible if the guard electrode 7 and the guarded electrode 5 are held at the same potential. This is achieved automatically by coupling these two electrodes to the input of the high gain operational amplifier 31. An operational amplifier when operating in the normal linear mode will exhibit a low differential input voltage.

The reference current $i_r$ is provided through transformer 27 which shifts the phase of rerference current $i_r$ 180° relative to the sample current $i_s$. The phaser current difference which flows to resistor 33 is thus essentially zero when the circuit is balanced with $i_s$ substantially equal to $i_r$. When the sample resistance 13 changes, $i_s$ will change upsetting the balance at the amplifier 31 input. This imbalance is amplified by amplifier 31, demodulated by synchronous detector 35, filtered by low pass filter 37, amplified as a D.C. error voltage by amplifier 39, and applied to the lamp system 45 by means of the driver 43. A change in amplifier 49 output voltage inversely follows the change in the light level to attenuator 47. The change at the output of amplifier 49 is applied to the electrode system such that the current $i_s$ is driven toward the level of current $i_r$ resulting in re-equalization of the two currents.

By maintaining a constant current $i_s$ through the sample, represented by resistor 13, the voltage across the sample is then directly related to its resistance $R_{13}$ by:

$$R_{13} = V_B/i_s,$$

where $V_B$ is the voltage at node B (amplifier 49 output). The sample resistivity $\rho$ for bulk measurements can be calculated by:

$$\rho = S/L\ (R_{13}),$$

where S is the area of electrode 5, and L is the spacing between electrodes 5 and F. For measurements of well wall resistance the resistance read will be that of the thin film of water plus the distributed resistance of the well wall and surrounding medium in the return path to the ground node. Because of the spreading effect on the current, the resistance at the well wall under the guarded electrode 5 greatly influences the overall resistance measured. Therefore, anomilies at the well wall surface significantly alter the output of the detector. This variation can then be plotted as the electrode system is lowered into a well in a helical scanning locus pattern.

Voltage $V_B$ is an A.C. voltage at the reference frequency of oscillator 23. It is converted to a proportional D.C. voltage. This is accomplished by means of a second synchronous detector 65, which is identical to the detector 35 described above and shown in FIG. 6. After filtering in the low pass filter 67 and additional amplification by amplifier 69, it is available for display or recording on a D.C. voltmeter, recorder or other utilization device connected at the output terminal C.

As instrument according to the embodiment shown in FIG. 4 was found to accurately (±0.2% of resistance value) measure sample resistances over the range of 300 ohms to 3 megohms with a single value of resistor 29 and at a measuring frequency of 10 kHz. The measuring frequency was controlled by the A.C. oscillator 23. By changing its frequency and the delay of multivibrator 75, measurements may be made at different frequencies. The instrument has been found to operate satisfactorily over a wide frequency range, 50 Hz to 50 kHz. Also, the current level through the sample $i_s$ was varied over a range of 50 to 1 (2 microamps to 100 microamps) without affecting instrument accuracy. This change is accomplished by varying resistor 29 through which the reference current $i_r$ flows.

Figure 8:
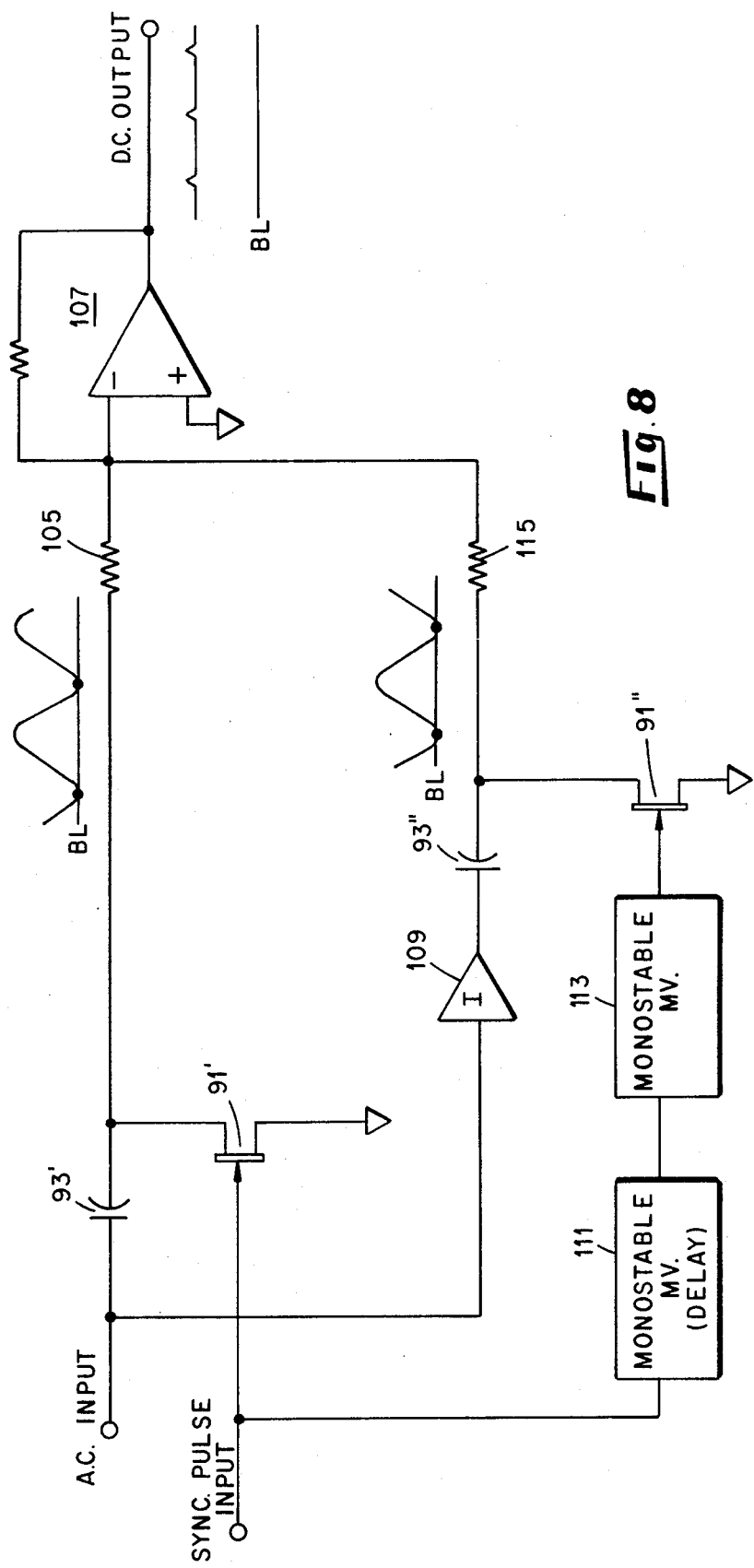
FIG. 8 is a schematic diagram of an alternate embodiment of the synchronous detector shown in FIG. 4.

Referring now to FIG. 7 there is shown an alternate embodiment for controlling the measuring current $i_s$ for the three-terminal probe arrangement, wherein like reference numerals indicate identical parts to the above described embodiment. In this embodiment, two wide-band analog multipliers 95 and 97 are connected in series and replace the light controlled attenuator 47 and lamp system 45, as shown in FIG. 4. A transformer 99 is added to maintain isolation of the probe measuring circuit including the sample current $i_s$ input to the control cirucit 19 and reference current $i_r$ to the control circuit 19. The output of the control circuit 19 in this embodiment would be the output of amplifier 39, shown in FIG. 4, which is the feedback loop to each of the analog multipliers 95 and 97 to control the multiplication factor of the A.C. signal from oscillator 23. The A.C. signal is applied through multiplier 95 and 97 to the inverting input of amplifier 49 through a resistor 101. The amplifier 49 feedback resistor 53 is selected to maintain the proper gain for amplifier 49. This circuit provides the controlled amplifier function 17, as shown in FIG. 3. The operation of the circuit is essentially as described in the above embodiment, but is superior to the light coupled embodiment because its speed of response is much greater by at least a factor of 10, allowing more rapid sample resistance 13 measurements. Referring now to FIG. 8, there is shown an alternate embodiment which may be substituted for the synchronous detectors 35 and 65 shown in FIG. 4. This circuit provides twice the output of the synchronous detectors as illustrated in detail in FIG. 6, responds more rapidly and also eliminates the carrier from the detector output. This circuit utilizes two field effect transistor detectors of the type shown in FIG. 6 with corresponding primed referenced numerals to indicate similar functions. The portion of the circuit including field effect transistor 91' and capacitor 93' is identical to the circuit shown in FIG. 6. The sync pulses applied to the gate electrode of FET 91' clamps the A.C. input signal at its minimum to the base line, as shown in FIG. 8, and this signal is applied through a resistor 105 to the summing junction input of the summing amplifier 107. This circuit differs in that the A.C. input signal is inverted by means of an inverter 109 connected between the A.C. signal input terminal and the capacitor 93'' of the second FET 91'' switching circuit. The reference pulses are delayed by means of a monostable multivibrator 111 connected to receive the reference pulse at its input. The output of monostable multivibrator 111 is connected to the input of a second monostable multivibrator 113 which shapes the trigger pulse for the gate of FET switch 91''. The delay provided by monostable multivibrator 111 is timed such that a trigger pulse on the gate of FET 91'' clamps the minimum level of the inverted A.C. signal to the base line, as shown. The signal is applied through resistor 115 to the summing junction input of summing amplifier 107. Since the D.C. signal passing through resistor 115 includes carrier signal which is 180° phase displaced from the carrier signal of the D.C. voltage applied through resistor 105, by summing the two signals at the summing amplifier 107 input, the carriers cancel but the D.C. components add so that the output is twice that achieved with the single FET switching arrangement. A small ripple occurs at the detector output as shown because of the slight distortion produced when each of the FET's 91' and 91'' momentarilly conducts, but the carrier is otherwise removed. Subsequent low pass filtering will easily remove the ripple.

Figure 9:
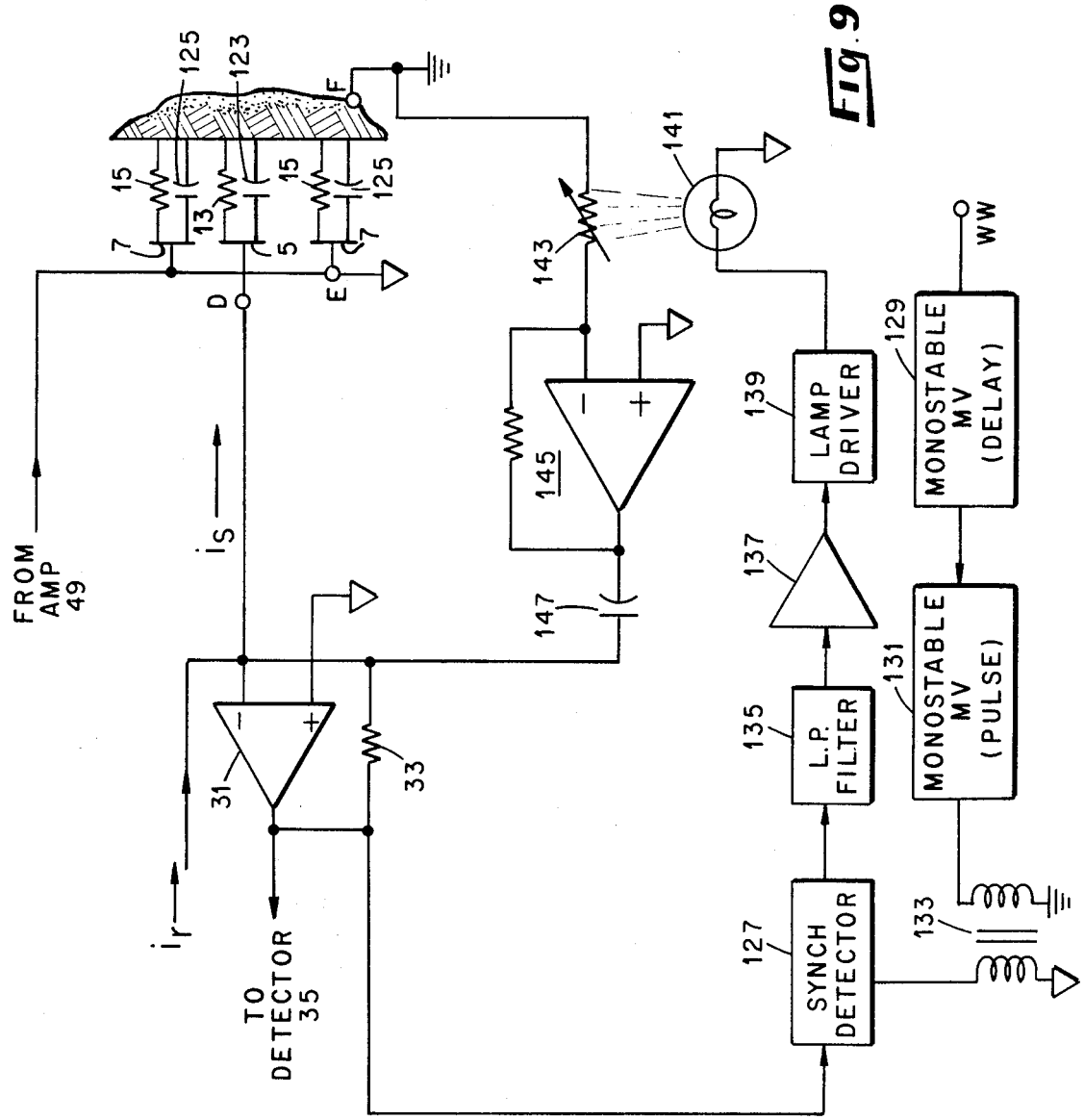
FIG. 9 is an alternate embodiment of the control circuit shown in block form in FIGS. 3 and 7.

Under certain conditions, such as when the dielectric constant of the sample is large and its resistance is high, and for measurements at high frequencies, the sample capacitive current component is sufficiently large to overload the control circuit 19. To overcome this problem a control circuit addition is provided according to the circuit of FIG. 9. This circuit incorportes an independent second control loop to nullify the capacitive sample current at the summing junction of the control circuit amplifier 31. The quadrature component of the current $i_s$ introduced by the sample capacitance represented as capacitors 123 and 125 is sensed at the output of amplifier 31. The output of amplifier 31 is connected to the input of an additional synchronous detector 127. Detector 127 may be either the embodiment shown in FIG. 6 or FIG. 8, and the reference input is derived from the output WW of the sync pulse generator 25 shown in FIG. 3. The pulse at terminal WW is fed to the input of a monostable multivibrator 129. Multivibrator 129 provides a fixed delay so that the reference pulse input to detector 127 clamps the quadrature current component at its minimum to produce a D.C. output signal which is proportional to the quadrature current error component. The output of multivibrator 129 is connected to the input of another monostable multivibrator 131 which provides a short duration reference pulse at its output when multivibrator 129 times out. The output of multivibrator 131 is connected to the primary side of an isolation transformer 133 which has its secondary side connected to the reference pulse input of detector 127. The principal use of transformer 133 is for isolation, but in view of the 180° phase displacement provided by the transformer 133, the monostable multivibrator delay 129 must be adjusted to compensate for the phase displacement through transformer 133. Once the signal is detected by detector 127, it is filtered by means of a low pass filter 135 connected to the output of detector 127. The filtered signal is amplified by means of connecting an amplifier 137 between the output of filter 135 and the input of a lamp driver 139. The output of the lamp driver 139 is connected through a lamp 141 to the system common. A photocell 143 is positioned to view the lamp 141 light intensity and provides gain adjustment accordingly to the input of an amplifier 145. The photocell 143 is connected between the amplifier input and ground potential. The output of amplifier 145 is connected through capacitor 147 to the summing input of amplifier 31. The amplifier 145 inverts the voltage appearing between the earth ground terminal F and the floating common. The output is manipulated with photocell 143 sensing the lamp 141 intensity. The current presented to the amplifier 31 summing junction through capacitor 147 is opposite in phase (180°) to the capacitive current from the sample capacitance represented by capacitor 123. Thus, cancellation occurs when the magnitudes are equalized by the additional control circuit.

Thus it will be seen that a very versatile instrument has been provided for three-terminal resistance measurements for bulk materials over a considerably wide range of resistance values which may be easily altered for use in various applications; for example, the measurement of materials in which the capacitive component is quite large. It will be obvious to those skilled in the art that various modifications and changes may be made without departing from the scope of the invention as set forth in the following claims, which are attached to and form a part of this specification.

What is claimed is:

1. In a resistance measuring device for measuring the resistance of bulk material including a probe arrangement having a first electrode electrically coupled to said material for sensing the current through said material, a second electrode spaced in close proximity to said first electrode and electrically coupled to said material for inducing a voltage across said material between said second electrode and a third ground electrode, a circuit for measuring the resistance of said material, comprising:

a reference voltage source;

a control circuit means connected to said first electrode for geneating a reference current in response to said voltage source and comparing said reference current with the current flowing through said material and generating an analog error signal proportional to the difference therebetween;

a controlled amplifier means having an output connected to said second electrode for amplifying the signal from said voltage source in response to the magnitude of said error signal to a value sufficient to force the current through said material to a value substantially equal to said reference current; and an output circuit means for sensing the output voltage of said controlled amplifier means and generating a signal whose amplitude is proportional to the resistance of said material.

2. The combination as set forth in claim 1 wherein said reference voltage source is an A.C. voltage source.

3. The combination as set forth in claim 2 wherein said control circuit means includes an isolation transformer having a primary winding connected between the output of said reference voltage source and ground potential and a secondary winding with one end connected to the output of said controlled amplifier means forming a circuit floating common connection, a resistor connected between the other end of said secondary winding and said first electrode of said probe, said resistor having a value corresponding to a selected value of said reference current; a first operational amplifier for sensing the difference between said reference current and the current flowing through said material and generating an A.C. error signal proportional to the difference therebetween; said operational amplifier having an inverting input connected to said first electrode of said probe, a non-inverting input connected to said floating circuit common connection, and a feedback resistor connected between the output of said first operational amplifier and said inverting input thereof; and means for converting said A.C. error signal at the output of said first operational amplifier to an analog error signal for controlling the output of said controlled amplifier means.

4. The combination as set forth in claim 3 wherein said controlled amplifier means includes a second operational amplifier having a non-inverting input connected to ground potential, an inverting input and an output connected to said second electrode of said probe, a light controlled attenuator means connected between the output of said reference voltage source and said inverting input of said second operational amplifier for controlling the gain of said amplifier according to the intensity of a light beam directed upon said attenuator; and wherein said converting means includes means for generating said light beam at an intensity proportional to said error signal.

5. The combination as set forth in claim 3 wherein said controlled amplifier means includes a second operational amplifier having a non-inverting input connected to ground potential, an inverting input and an output connected to said second electrode of said probe and an analog multiplifer means connected between the output of said reference voltage source and said inverting input of said second operational amplifier for controlling the amplitude of the output signal of said second operational amplifier in response to the magnitude of said analog error signal generated by said converting means.

6. The combination as set forth in claim 3 for measuring the resistance of bulk material having a large capacitive, quadrature current component further including a quadrature current control means for sensing said quadrature current component flowing through said material and generating an equal current opposite in phase to that of said quadrature component and applying said opposite phase current to said inverting input of said first operational amplifier thereby canceling the effet of said quadrature component flowing through said material.

* * * * *